United States Patent [19]

Rabatin

[11] Patent Number: 4,485,308

[45] Date of Patent: Nov. 27, 1984

[54] PHOTO DETECTION SYSTEM

[75] Inventor: Jacob G. Rabatin, Chardon, Ohio

[73] Assignee: General Electric Company, Schenectady, N.Y.

[21] Appl. No.: 371,836

[22] Filed: Apr. 26, 1982

[51] Int. Cl.$^3$ .......... G01N 21/64

[52] U.S. Cl. .......... 250/461.1; 378/44

[58] Field of Search .......... 250/458.1, 461.1, 302, 250/271; 378/44, 46, 162, 188

[56] References Cited

U.S. PATENT DOCUMENTS

| | | | |
|---|---|---|---|
| 3,305,089 | 2/1967 | Fraenkel | 378/44 |
| 3,617,743 | 11/1971 | Rabatin | 250/460 |
| 3,662,181 | 5/1972 | Hercher et al. | 250/461.1 |
| 3,795,814 | 3/1974 | Rabatin | 250/460 |
| 3,881,941 | 5/1975 | Kernohan | 106/20 |
| 3,995,157 | 5/1975 | Holub et al. | 250/302 |
| 4,015,131 | 3/1977 | McDonough et al. | 250/461.1 |
| 4,136,778 | 1/1979 | Wortman et al. | 378/44 |
| 4,160,902 | 7/1979 | van Wijngaarden | 250/461.1 |

*Primary Examiner*—Janice A. Howell
*Attorney, Agent, or Firm*—John F. McDevitt; Philip L. Schlamp; Fred Jacob

[57] ABSTRACT

A photo detection system is described utilizing an x-ray source to produce light emission on one or more phosphor materials being used to mark or tag various objects. More particularly, x-ray excitable phosphors are contained in a suitable medium such as marking ink to produce visible emission when irradiated by said x-ray source so that optical detection means positioned adjacent the x-ray source provide a response when objects marked with said phosphors are subjected to such inspection. In the preferred embodiments, an improved postal detection system is provided wherein the postal stamps are marked with at least one x-ray excitable phosphor and said photo detection system can further include a plurality of detection stations along with multiple optical photo detection means at a single station and even a supplemental source of ultraviolet radiation to excite one or more of said phosphors.

10 Claims, 1 Drawing Figure

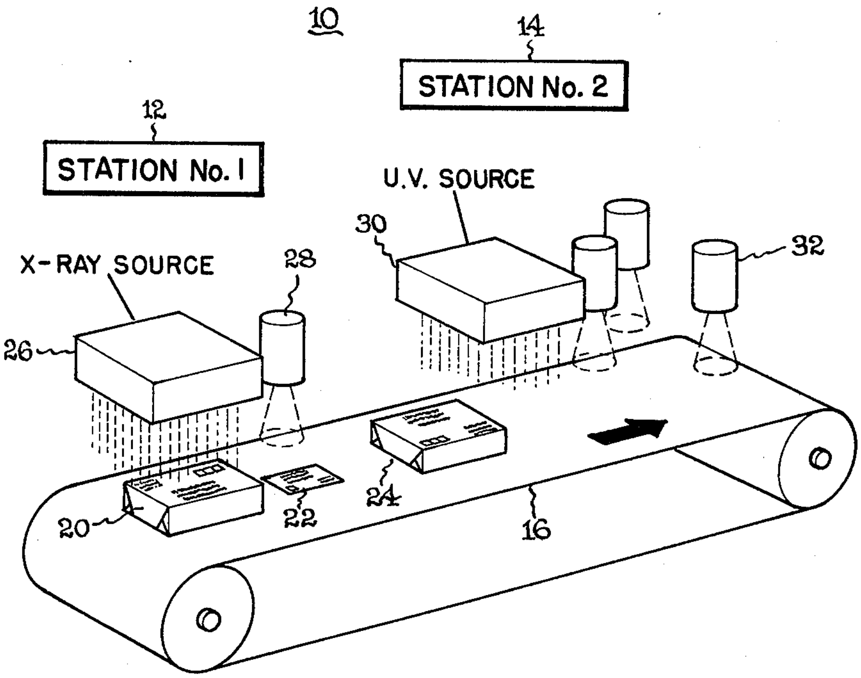
10
14
STATION No. 2
12
STATION No. 1
U.V. SOURCE
30
32
X-RAY SOURCE
28
26
20
22
24
16

PHOTO DETECTION SYSTEM

BACKGROUND OF THE INVENTION

The present invention relates generally to utilization of x-ray fluorescence in a photo detection system. More particularly, the present invention provides an improved photo detection system by utilizing various inorganic phosphors that respond efficiently to x-ray excitation in order to produce visible emission more effectively than now provided with ultraviolet excitation.

It is known to employ various ultraviolet radiation excitable phosphors to detect objects marked with said phosphors by optical photo detection means. For example, in U.S. Pat. No. 3,881,941, assigned to the present assignee, there is disclosed a utilization of alkali metal polytungstate phosphors containing europium for an automated postal sorting system wherein the postal stamps or imprints contained upon envelopes, post cards, magazines, packages and the like that bear a marking ink containing said phosphor are identified with a photo detection system. By using such identification means, it becomes possible to distinguish any stamps bearing said marking ink and route the mail automatically after detecting the information therein provided such as: cancellation, local delivery, air-mail delivery, etc. With said photo detection system, the mail is delivered automatically by conveyance means to a detection system including an ultraviolet radiation source positioned to irradiate mail marked with said ultraviolet radiation excitable phosphor and which further includes optical photo detection means positioned adjacent said ultraviolet radiation source which respond to the visible emission produced by the irradiated phosphors. As disclosed in said prior art patent, such photo detection system can be made responsive to phosphor afterglow as a means to avoid problems experienced when background luminescence is also produced by pigments and dyes found in the mail envelopes or other packaging materials marked with this type detection ink. While pulsing of the ultraviolet radiation source is also mentioned as a further means to avoid false detection signals generated by background fluorescence along with elaborate optical filtering of the visible emission given off by the irradiated phosphor, the organic and inorganic phosphors now being used in this manner do not provide a strong fluorescent signal. A greater intensity of the fluorescent signal with respect to the background luminescent signal is thereby still needed to provide a better "signal to noise ratio" for response by the optical photo detection means being employed in this type detection system.

In more recently issued U.S. Pat. No. 3,995,157, also assigned to the present assignee, there is disclosed a surface flaw detection system which employs particular organic phosphor materials suspended in a coating composition with an organic binder. There is again employed an ultraviolet radiation source to produce visible emission in the phosphor coating and with said visible emission being detected by optical photo detection means to reveal flaws when reflected from the coated surface of the object being inspected. It is also recognized in said patent that visible illumination can interfere with optical detection of the flaws when reflected from the treated surface so that particular optical photo detection means are selected for a better signal to noise ratio.

SUMMARY OF THE INVENTION

It has now been discovered that use of x-ray excited fluorescence can significantly ameliorate all of the above noted problems and also provide a photo detection system that identifies a greater number of tagging or marking variations. Briefly, the presently improved photo detection system includes an x-ray source positioned to irradiate objects marked with an x-ray excitable phosphor, optical photo detection means positioned adjacent said x-ray source which is responsive to the visible emission produced by the irradiated phosphor, and one or more objects which have been marked with the medium containing said phosphor. A particularly useful class of phosphors in the present detection system is an x-ray excitable rare earth activated phosphor by reason of its efficient absorption and wide response to x-ray excitation along with providing a varied emission color response. A number of said rare earth activated phosphors also provide visible emission when excited by ultraviolet radiation and which can further include a different color response than when excited by x-rays. It thereby becomes possible to further employ an ultraviolet radiation source in the present photo detection system for even greater variation in the information detected by said system.

In one preferred embodiment, a phosphor mixture is provided in the tagging medium wherein one phosphor material is excited by x-rays only while the remaining phosphor is excited only by ultraviolet radiation. A pair of detection stations are employed in said embodiment utilizing each type radiation source to produce a different visible emission response in the tagging medium. As used herein with respect to the phosphor emission response, the term "visible" includes near ultraviolet and infrared emission as well as visible emission since optical photo detector means are available that respond to these types of radiation. As further contemplated for embodiments employing a plurality of detection stations only phosphors exhibiting minimum afterglow should be selected so that an improved signal to noise ratio of response will be preserved at each detection station. Additional phosphors can also be employed in said phosphor mixture to provide a still different emission color response upon irradiation. With said phosphor admixtures, a plurality of optical photo detection means is advantageously provided at one or more detection stations having optical color filters to selectively detect the different color emission provided by each phosphor. Pulsing any ultraviolet source used in said photo detection system will again help to preserve an improved signal to noise ratio of response.

In a different preferred embodiment, an improved postal detection system is provided which includes a plurality of detection stations:

(1) at least one of said detection stations including an x-ray source positioned to irradiate postal stamps marked with a first x-ray excitable phosphor, optical photo detection means positioned adjacent said x-ray source which is responsive to visible emission produced by the irradiated first phosphor, and postal stamps which have been marked with a medium containing said first phosphor, and (2) at least another of said detector stations including a source of ultraviolet radiation positioned to irradiate postal stamps marked with a second ultraviolet radiation excitable phosphor, optical photo detection means positioned adjacent said ultraviolet radiation source which is responsive to the visible emission produced by the irradiated second phosphor and postal stamps marked with a medium containing said second phosphor.

The postal stamps are advantageously marked with a medium containing both type phosphors and to which can be further admixed phosphors exhibiting a different color response. Accordingly, a plurality of photo detector means can be employed at the same detection station having different color optical filters to selectively detect the color emission provided by each phosphor.

DESCRIPTION OF THE DRAWING

The accompanying drawing is a flow chart illustrating a pair of specific detection stations for a postal inspection system in accordance with the present invention.

DESCRIPTION OF THE PREFERRED EMBODIMENTS

Referring now to the accompanying drawing, there is illustrated a preferred embodiment for a postal inspection system 10 according to the present invention having a pair of detection stations 12 and 14 being positioned along the travel path of a moving conveyor 16 on which various types of mail parcels 20, 22 and 24 are placed. As can be noted, each of said mail parcels bear postal stamps which have been previously marked with an optically transparent adhesive ink containing one or more phosphors as an indicia medium permitting the mail to be thereafter sorted. By using the information imparted when said phosphors respond to excitation provided at each detection station, it becomes possible to distinguish any stamps bearing the present marking ink and route the mail automatically after detection of the information therein provided with the use of conventional sorting means (not shown). Accordingly, at the first detection station 12 there is located a shielded x-ray source 26 that is placed in close physical proximity to a conventional photo multiplier tube 28. The x-ray source produces low energy x-rays and is also properly shielded from the adjacent photo multiplier tube for reduced noise in the fluorescent signal being generated in order to improve the signal to noise ratio. On excitation by said x-ray source, the visible emission registered at photo multiplier tube 28 will thereby depend upon the phosphor composition present in the marking ink used on a particular stamp. Routine stamp cancellation can be effected with said information at first detection station 12 as well as denoting if all mail parcels contain stamps, including even the aggregate value thereof.

Additional sorting information is provided on the moving mail parcels at the second detection station 14. More particularly, a conventional ultraviolet radiation source such as an ultraviolet lamp is suitably positioned thereat for exposure of the marked postal stamps to this type radiation. A second optical photo detection means 32 is positioned nearby for response to the visible emission produced from one or more ultraviolet radiation excitable phosphors contained in the stamp marking ink. Different fluorescent signals can be generated in this manner at the second detection station than were generated at the first detection station in order to provide such additional sorting information as air-mail or local mail delivery. If a stamp marking ink contains a phosphor mixture that includes both x-ray and ultraviolet excitation type phosphors, passage of such a stamp through both stations expands the sorting information details which can be imparted thereby to even include zip coding and the like. As can be further noted from said drawing, optical photo detection means 32 at the second detection station includes a plurality of photo multiplier devices and which can be suitably provided with color filters to differentiate various emission colors produced when a stamp marking ink is irradiated. It will be evident that such use of color differentiation read-out upon phosphor admixtures at either detection station provides a means to increase the amount of sorting information furnished with the illustrated photo detection system.

Typical examples are given in Table I below for inks exhibiting x-ray fluorescence in accordance with the present invention. Said marking inks were prepared by dispersing the particular phosphor in acetone and then filtering said dispersion through a standard white color office typing paper containing an organic whitening agent. A relatively uniform layer of phosphor was thereby provided on the paper substrate at a phosphor loading level in the range 1–4 milligrams per square centimeter. The dried samples were next placed in a holder over a dental x-ray generator to be excited by x-rays at 20 and 40 KVp and 1 milliampere dosage. The signal to noise ratios ($\alpha$) were determined at photo multiplier tube settings of 1,000 and 1,500 volts. A lead glass filter was used to reduce x-rays from reaching the photo multiplier device in order to improve the signal to noise ratio. The B values reported in said Table represent conventional relative brightness measurements made upon the unmarked paper as well as the phosphor coatings for direct calculation of the reported ratios therefrom.

TABLE I

| Sample | Phosphor (Response) | Photomultiplier (Volts) | X-Ray Levels (20 KVp) B | (20 KVp) $\sigma$ | (40 KVp) B | (40 KVp) $\sigma$ |
|---|---|---|---|---|---|---|
| 1 | Paper Blank, | 1000 V | .002 | — | .005 | — |
| | (Noise) | 1500 | .010 | — | .060 | — |
| 2 | LaOBr: .05 Tb | 1000 | .6 | 300 | 3.6 | 720 |
| | (Green) | 1500 | 10.5 | 1050 | 75.0 | 1250 |
| 3 | BaFCl: .05 Eu | 1000 | .075 | 38 | .60 | 120 |
| | (Ultraviolet) | 1500 | 1.70 | 170 | 13.0 | 216 |
| 4 | $(Sr_3(PO_4)_2)_3SrCl_2$: | 1000 | .070 | 35 | .60 | |
| | Eu (Blue) | 1500 | 1.60 | 160 | 13.0 | 216 |
| 5 | LaOBr: .003 Tm | 1000 | .12 | 60 | .85 | 170 |
| | (Ultraviolet) | 1500 | 2.50 | 250 | 17.0 | 283 |

All above reported ratios for the illustrated rare earth phosphors greatly exceed the 15:1 ratio now being achieved in a conventional photo detection system utilizing ultraviolet excitation. The different emission color response exhibited by the illustrated phosphors is also reported in said Table. It will be evident from the variety of emission colors reported that still other phosphors can be used in combination with appropriate color read-out devices.

It will be apparent from the foregoing description that a generally improved photo detection system has been disclosed using x-ray fluorescence. It will also be apparent that various modifications can be made in the above illustrated embodiments without departing from the spirit and scope of the present invention. For example, variation in the phosphor loading of a particular marking ink according to the present invention produces variation in the signal to noise ratio of the fluorescent response with a higher ratio being desirably obtained at higher phosphor loading. Additionally, the pulsing of an ultraviolet radiation source in the present photo detection system helps improve the signal to noise ratio by reducing any afterglow response in the phosphor stimulated thereby. It is intended to limit the present invention, therefore, only by the scope of the following claims.

What I claim as new and desire to secure by United States Letters Patent is:

1. An improved photo detection system which includes a low energy x-ray source positioned to irradiate objects marked with a plurality of phosphors having diffferent emission color characteristics including an x-ray excitable phosphor selected from the class of inorganic rare earth containing compounds activated with a rare earth ion and exhibiting minimum afterglow, a plurality of optical photo detection means positioned adjacent said x-ray source and each being selectively responsive to the emission color produced by a single phosphor, and one or more objects which have been marked on the surface with a medium containing said phosphors.

2. A system as in claim 1 which further includes a plurality of x-ray sources.

3. A system as in claim 1 which further includes a source of ultraviolet radiation positioned adjacent one of said photo detection means.

4. A system as in claim 1 wherein optical color filters provide the means to selectively detect different color emission provided by each phosphor.

5. A system as in claim 3 wherein the ultraviolet radiation source provides pulsed radiation.

6. An improved postal detection system which includes a plurality of detection stations (1) at least one of said detection stations including a low energy x-ray excitation source positioned to irradiate postal stamps marked with a first x-ray excitable phosphor selected from the class of inorganic rare earth containing compounds activated with a rare earth ion and exhibiting minimum afterglow, optical photodetection means positioned adjacent said x-ray source which is responsive to visible emission produced by the irradiated first phosphor, and postal stamps which have been marked with a medium containing said first phosphor, and (2) at least another of said detection stations including an excitation source of ultraviolet radiation positioned to irradiate postal stamps marked with a second ultraviolet radiation excitable phosphor, optical photo detection means positioned adjacent said ultraviolet radiation source which is responsive to the visible emission produced by the irradiated second phsophor, and postal stamps marked with a medium containing said second phosphor.

7. A system as in claim 6 wherein the postal stamps are marked with a medium containing both phosphors.

8. A system as in claim 6 which includes a plurality of x-ray sources at the same detection station.

9. A system as in claim 6 which employs a plurality of photo detection means at the same detection station having different color optical filters in combination with postal stamps marked with a mixture of phosphors each producing different color emission.

10. A system as in claim 6 wherein the ultraviolet radiation source provides pulsed radiation.

* * * * *